United States Patent Office 2,787,736
Patented Apr. 2, 1957

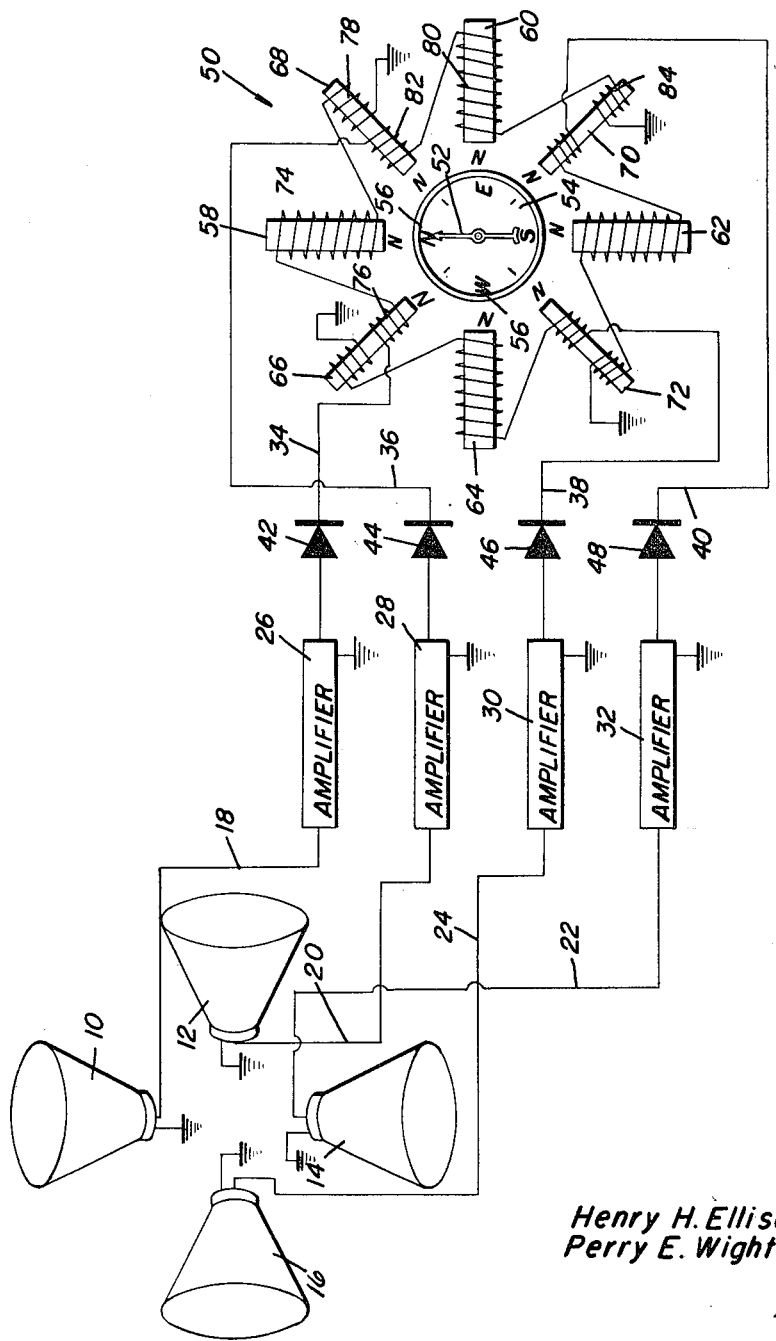

2,787,736

DIFFERENTIAL METER

Henry H. Ellison, Oxford, and Perry E. Wightman, Easton, Md.

Application April 15, 1954, Serial No. 423,304

3 Claims. (Cl. 317—123)

This invention relates to a device for ascertaining the direction of the location of a source of signals and incorporates a novel differential meter for indicating the direction of the source of the signal.

The primary object of the present invention resides in the provision of a meter for use with a detecting system which meter employs cores having coils of varying sizes wound thereon so that signals induced upon the coils will cause a magnetic body to move in a manner so as to indicate the direction of the greatest signal strength as determined by the relative strengths of a number of magnetic fields as they reflect varying strengths of the applied signals thereby providing a true indication of the direction of the source of the signal.

Incorporated in the invention are a plurality of cores which are spaced about a movable magnetic body similar to a compass. These cores have conductors wound thereon with each of the conductors being mainly wound on one of the cores forming a comparatively large coil and being wound to a lesser extent on the two adjacent cores forming smaller coils so that magnetic fields of differing strength will be induced upon application of an electric potential on the conductors. This electrical potential can be applied by an amplifier receiving a signal from a trumpet ear or other similar pick-up device.

Applications of this invention include the use in air raid detection equipment, navigation during fog and when there is reduced visibility, various testing equipment, and the like.

Still further objects and features of this invention reside in the provision of a differential meter that is simple in construction and manufacture, which is highly sensitive and which because of the varying strengths of the coacting magnetic fields are anti-hunting, and which meter is inexpensive in construction thereby permitting wide distribution.

These, together with the various ancillary objects and features of the invention which will become apparent as the following description proceeds, are attained by this apparatus, a preferred embodiment of which has been illustrated in the accompanying drawing, by way of example only, wherein:

The figure is a schematic diagram of the differential meter as utilized in combination with a detection apparatus.

With continuing reference to the accompanying drawing, wherein like reference numerals designate similar parts throughout the various views, reference numerals 10, 12, 14 and 16 generally designate trumpet ears which are adapted to pick up mechanical vibrations such as those emanating from airplanes, or the like, and convert the mechanical vibrations into electrical signals which are applied through conductors 18, 20, 22 and 24 on amplifiers 26, 28, 30 and 32. The amplifiers then apply an electrical potential across conductors 34, 36, 38 and 40 through rectifiers 42, 44, 46, and 48.

Reference numeral 50 generally designates the differential meter comprising an important structure utilized in the invention. This differential meter 50 includes a movable magnetic member 52 in the form of a compass, or the like, and an indicator dial 54 having indicia as at 56 thereon representing the various directions, such as north, south, east and west, may be provided.

Surrounding the movable member 52 are a plurality of comparatively large cores 58, 60, 62 and 64, as well as a plurality of somewhat smaller cores 66, 68, 70 and 72. The conductor 34 is mainly wrapped about the core 58 to form a coil 74, but is wrapped to a lesser extent about the core 66 and 68 to form smaller coils 76 and 78. The conductor 36 is likewise wrapped mainly about the core 60 to form a coil 80 while being wrapped to a lesser extent to form coils 82 and 84 on the cores 68 and 70, respectively. In like manner the conductors 38 and 40 are positioned about the other cores. As can be readily understood, if a signal were to be picked up by the trumpet ear 10 and not by any of the other trumpet ears, the maximum magnetic field formed by cores 66, 58, and 68, and their coils 76, 74, and 78, would be applied across the direction of the large core 58, thus causing the movable member 52 to move into alignment with such magnetic field and to move into alignment with core 58.

Should, however, a further signal of weaker strength, for example, also be picked up by the trumpet ear 12, a lesser magnetic field will be induced on cores 68, 60, and 70 by their coils 82, 80, and 84. The combined magnetic field thus produced will interact with the magnetic field produced by cores 66, 58, and 68 and their coils 76, 74, and 78 and therefore the movable member 52 will coact with the indicia 56 to designate the direction of the signal source. This is because there is the coil 76 on the core 66 which will cause a magnetic field as well as the coils 78 and 82 which are on the core 68 forming a magnetic field of somewhat greater extent than is formed at the core 66 and the coil 84 about the core 70 will cause a smaller magnetic field than is present at the core 66. Because of the varying magnetic fields, the movable member 52 will then move into a position where the magnetic field is effectively at a maximum and the varying sizes of the core pieces will cause an anti-hunting operation of the movable member 52. The movable member will then coact with the indicia 56 to designate the direction of the source of the signal.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A differential meter comprising a movable magnetic body, a plurality of comparatively large cores surrounding said body, a plurality of comparatively small cores surrounding said body, said small cores being alternatingly arranged with said large cores, a plurality of conductors, each of said conductors being mainly wound on one of said large cores forming a comparatively large coil and being wound to a lesser extent on the two adjacent smaller cores forming comparatively smaller coils so that magnetic fields of differing strength will be induced upon application of an electric potential on one of said conductors.

2. A differential meter comprising a movable magnetic body, a plurality of cores surrounding said body including a first group of cores alternating with a second group of cores, a plurality of electrical conductors wound on said cores forming coils for creating magnetic fields when an electrical potential is applied across said conductors, each of said conductors being mainly wound on one of said first group of cores forming a comparatively large coil, exclusively wound on said one of said first group of cores and being wound to a lesser extent on the two adjacent cores of said second group of cores forming smaller coils so that magnetic fields of differing strength will be induced upon application of an electric potential on one of said conductors.

3. A differential meter comprising a movable magnetic body, a plurality of cores surrounding said body including a first group of cores alternating with a second group of cores, a plurality of electrical conductors wound on said cores forming coils for creating magnetic fields when an electrical potential is applied across said conductors, each of said conductors being mainly wound on one of said first group of cores forming a comparatively large coil, exclusively wound on said one of said first group of cores and being wound to a lesser extent on the two adjacent cores of said second group of cores forming smaller coils so that magnetic fields of differing strength will be induced upon application of an electric potential on one of said conductors, said first group of cores varying in size from said second group of cores.

References Cited in the file of this patent

UNITED STATES PATENTS

| | | |
|---|---|---|
| 1,842,347 | Eaton | Jan. 19, 1932 |
| 2,154,437 | Colton | Apr. 18, 1939 |
| 2,376,730 | Steinhoff | May 22, 1945 |